July 23, 1963  H. FEHR  3,098,571
GRAIN BIN CONVEYOR SUPPORTING CHANNEL
Filed March 23, 1962
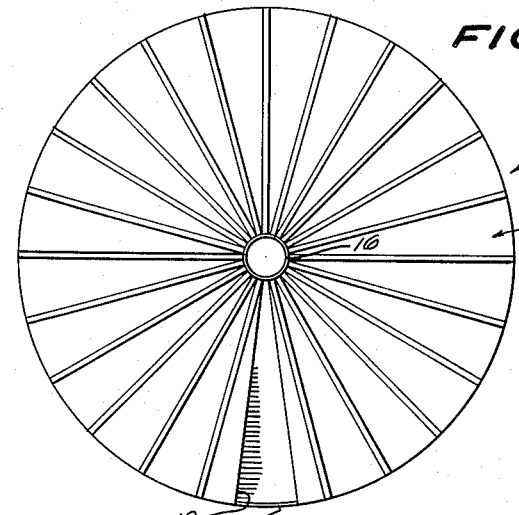
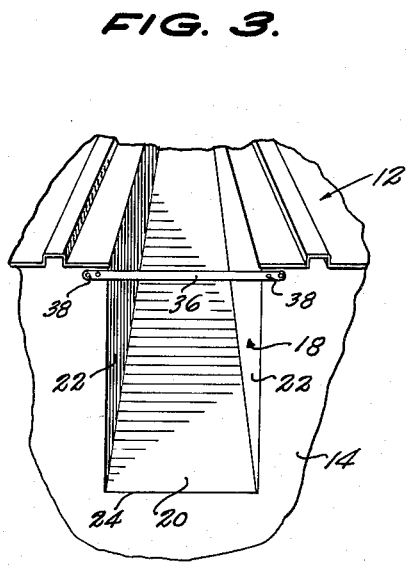
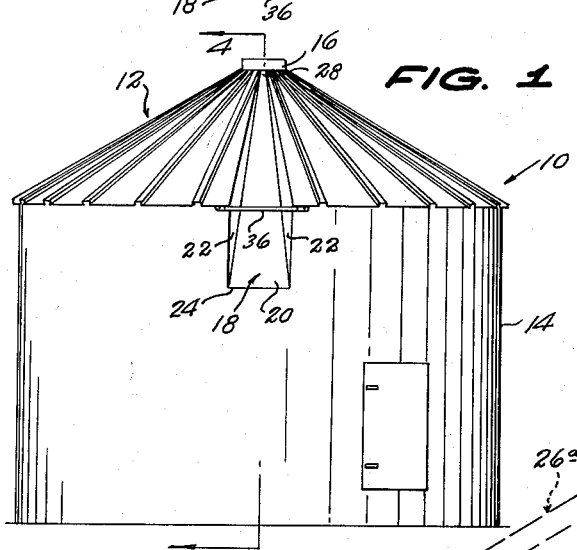
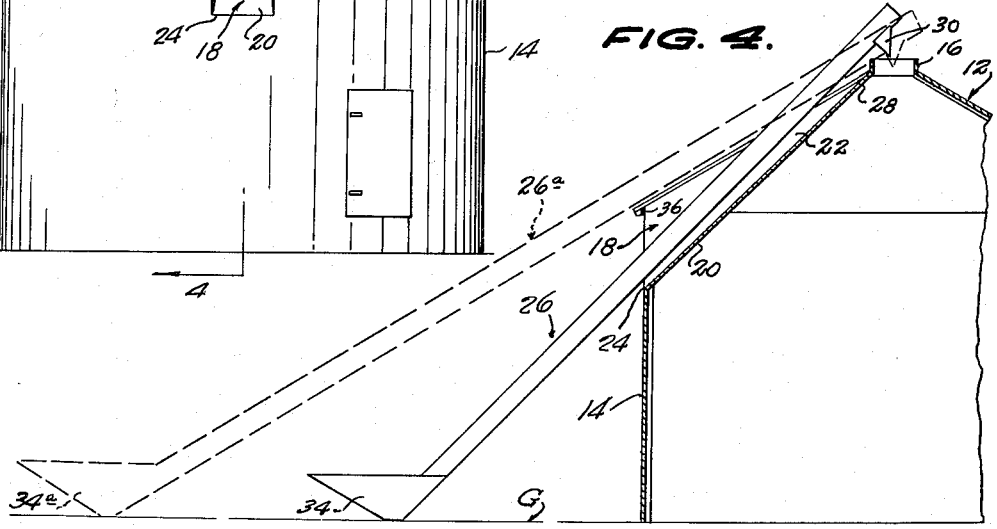
INVENTOR.
HENRY FEHR,
BY
McMorrow, Berman & Davidson
ATTORNEYS _United States Patent Office_ 3,098,571
Patented July 23, 1963

3,098,571
GRAIN BIN CONVEYOR SUPPORTING CHANNEL
Henry Fehr, P.O. Box 491, Sutton, Nebr.
Filed Mar. 23, 1962, Ser. No. 182,046
3 Claims. (Cl. 214—17)

This invention relates to a novel grain bin having a conveyor supporting channel.

The primary object of the invention is the provision of a grain bin having a channel in its roof and sidewall, which declines from the intake opening in the roof of the bin to a level below the remainder of the roof, whereby a grain conveyor is supported in the channel at a wider angle to the ground, and the spout of the conveyor is desirably closer to the intake opening. This enables the more efficient use of a shorter conveyor and reduces the amount of power otherwise required to load the bin.

Another object of the invention is the provision of a grain bin of the character indicated above, wherein the conveyor supporting channel is deep enough to stabilize a conveyor therein against shifting forces imposed on the conveyor, as an incident to operation thereof, and against being shifted by high velocity winds.

Other important objects and advantageous features of the invention will be apparent from the following description and the accompanying drawings, wherein, for purposes of illustration only, a specific form of the invention is set forth in detail.

In the drawings:

FIGURE 1 is a side elevation of a grain bin incorporating a conveyor channel in accordance with the present invention;

FIGURE 2 is a top plan view of FIGURE 1;

FIGURE 3 is an enlarged fragmentary side elevation showing details of the channel;

FIGURE 4 is a vertical transverse section taken on the line 4—4 of FIGURE 1, showing in full lines a relatively short conveyor supported in the bin channel, and in phantom lines a relatively long conveyor conventionally supported on the roof of the bin.

Referring in detail to the drawings, wherein like numerals designate like parts through the several views, the numeral 10 designates a cylindrical grain bin, having an outwardly declining roof 12, of conical form, and a bin sidewall 14. The roof 12 has, at its highest point, here shown as the apex thereof, a grain inlet opening, in the form of an upstanding neck 16. It is to be noted that the invention herein disclosed, applies equally to rectangular and other forms of bins having declining roofs.

In accordance with the present invention the bin roof 12 is formed with a conveyor supporting channel 18, extending radially outwardly from the intake or inlet neck 16, which has a flat bottom wall 20, and flat parallel spaced side walls 22. The channel side walls 22, as shown in FIGURES 1 to 3, flare toward its lower end 24, so that the lower end 24 is wider than and provides for some lateral movement, in the channel 18, of a conveyor 26, and so that its narrower upper end 28 is not substantially wider than a conveyor, and closely receives the part of the channel engaged therein, so as to preclude lateral shifting of the conveyor's discharge spout 30 relative to the intake neck 16 of the bin.

The bottom wall 20 of the channel 18, at its upper end 28, is substantially on the same level as the bin roof 12, and declines outwardly at a substantially wider angle than the roof, so as to open, at its lower end 24, through the bin side wall 14, to which the bottom wall 20 and the channel side walls 22 are fixed. As shown in FIGURE 4, the height of the channel 18 is substantially greater than the girth of the conveyor 26, for the purposes of allowing the conveyor some desirable latitude in its angle to the ground G and the bin roof, without lessening the stabilizing support afforded to the conveyor, by the conveyor side walls 22, and without exposing the conveyor, within the channel, to the effects of high velocity winds.

As shown in FIGURE 4, the provision of the channel 18 in the bin 10 enables the use of a shorter conveyor 26, whose hopper 34 can then rest upon the ground G, or other support, at a point closer to the bin 10, than is the case with the hopper 34$^a$ of a longer conveyor 26$^a$, resting upon the bin roof 12. This enables a worthwhile reduction in the amount of power required to load the bin, since the smaller amount of grain present in and being driven upwarly through the conveyor is less than that present in the longer conveyor 26$^a$.

In order to reinforce the channel 18, maintain its side walls 22 in parallel relationship, and serve as means for retaining the conveyor 26, in the channel, as during handling and positioning the conveyor in the channel, a cross bar 36 is extended across the upper end of the opening of the lower end 24 of the channel, and is secured, at its ends, to the bin side wall 14, as indicated at 38.

It will be understood that both the width and the depth of the channel 18 are intended to be varied to accommodate different sizes of conveyors, and different bin structures.

Although there has been shown and described a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A grain bin having a declining roof, a sidewall, and an inlet opening at the upper end of the roof, said roof being formed with a radial opening extending from said inlet opening to the lower end of the roof, a channel having spaced side walls fixed at their upper edges to the edges of the radial opening and a bottom wall fixed to the lower edges of said side walls, said bottom wall declining at a greater angle than the roof, the sidewall of the bin having an opening extending downwardly from the lower end of the roof to edges of which the depressed ends of the side walls and bottom wall of the channel are fixed.

2. A grain bin having a declining roof, a sidewall, and an inlet opening at the upper end of the roof, said roof being formed with a radial opening extending from said inlet opening to the lower end of the roof, a channel having spaced side walls fixed at their upper edges to the edges of the radial opening and a bottom wall fixed to the lower edges of said side walls, said bottom wall declining at a greater angle than the roof, the sidewall of the bin having an opening extending downwardly from the lower end of the roof to edges of which the depressed ends of the side walls and bottom wall of the channel are fixed, and a cross bar fixed to the bin sidewall and extending across the space between the channel side walls at the upper edges thereof.

3. A grain bin having a declining roof, a sidewall, and an inlet opening at the upper end of the roof, said roof being formed with a radial opening extending from said inlet opening to the lower end of the roof, a channel having spaced side walls fixed at their upper edges to the edges of the radial opening and a bottom wall fixed to the lower edges of said side walls, said bottom wall declining at a greater angle than the roof, the sidewall of the bin having an opening extending downwardly from the lower end of the roof to edges of which the depressed ends of the side walls and bottom wall of the channel are fixed, and a cross bar fixed to the bin sidewall and extending across the space between the channel side walls at the upper edges thereof, said channel flaring outwardly and downwardly, the upper end of the channel being narrower than the lower end of said channel and the lower end of the channel being wider than the upper end of said channel.

References Cited in the file of this patent

UNITED STATES PATENTS

| | | |
|---|---|---|
| 1,466,010 | Wittler | Aug. 28, 1923 |
| 2,973,110 | Gentle | Feb. 28, 1961 |